United States Patent
Bonhomme (10) Patent No.: US 7,079,608 B2
(45) Date of Patent: Jul. 18, 2006

(54) METHOD AND DEVICE FOR CHANNEL ESTIMATION, IN PARTICULAR FOR A CELLULAR MOBILE TELEPHONE

(75) Inventor: Corinne Bonhomme, Sergy (FR)

(73) Assignee: Stmicroelectronics N.V., Amsterdam (NL)

( * ) Notice: Subject to any disclaimer, the term of this patent is extended or adjusted under 35 U.S.C. 154(b) by 811 days.

(21) Appl. No.: 09/993,913

(22) Filed: Nov. 6, 2001

(65) Prior Publication Data
US 2002/0115412 A1 Aug. 22, 2002

(30) Foreign Application Priority Data
Jul. 11, 2000 (EP) .................. 00123489

(51) Int. Cl.
*H03D 1/04* (2006.01)
*H03H 7/30* (2006.01)
*H04B 1/10* (2006.01)

(52) U.S. Cl. .................. 375/346; 375/230; 375/232; 375/349

(58) Field of Classification Search ........ 375/230–349; 370/208, 347
See application file for complete search history.

(56) References Cited

U.S. PATENT DOCUMENTS

| 4,852,090 | A | * | 7/1989 | Borth | 370/347 |
| 5,204,878 | A | * | 4/1993 | Larsson | 375/232 |
| 5,251,233 | A | * | 10/1993 | Labedz et al. | 375/230 |
| 6,757,345 | B1 | * | 6/2004 | Heinila | 375/349 |

OTHER PUBLICATIONS

Otuski et al., *Performance of Modulation-Level-Controlled Adaptive Modulation Systems*, Electronics & Communication in Japan, Part I, vol. 79, No. 7, 1996, pp. 81-93.

* cited by examiner

Primary Examiner—Khai Tran
Assistant Examiner—Cicely Ware
(74) Attorney, Agent, or Firm—Lisa K. Jorgenson; Allen, Dyer, Doppelt, Milbrath & Gilchrist, P.A.

(57) ABSTRACT

A method for estimating the impulse response of an information transmission channel includes evaluating a useful number of coefficients of an impulse response of the information transmission channel as a function of actual characteristics of the information transmission channel. This evaluation is carried out, for example, by using a time domain spreading parameter of the channel.

15 Claims, 7 Drawing Sheets

METHOD AND DEVICE FOR CHANNEL ESTIMATION, IN PARTICULAR FOR A CELLULAR MOBILE TELEPHONE

FIELD OF THE INVENTION

The invention relates to the field of communications, and, more particularly, to the transmission of digital information. The invention especially, but not exclusively, relates to the field of cellular mobile telephones such as those which use the global system for mobile communications (GSM), the related enhanced data GSM environment (EDGE), or the universal mobile telecommunications system (UMTS) system, for example.

BACKGROUND OF THE INVENTION

The invention relates more particularly to channel estimation (i.e., sounding), or the estimation of the impulse response of a transmission channel transporting information from a transmitter to a receiver via a propagation medium. This propagation medium may be air in the case of cellular mobile telephones, or any other propagation medium (e.g., a cable) in other applications.

One fundamental factor limiting the performance of a digital communication system is the phenomenon well known to the person skilled in the art as inter-symbol interference. Such inter-symbol interference within the receiver causes each symbol transmitted (e.g., a bit) to take up an amount of time greater than the initial duration of the symbol (i.e., the bit time). In other words, the signal received at a given instant depends not only on a single symbol (e.g., bit), but also on the other symbols (bits) sent which extend over durations longer than those of one symbol (bit time).

In practice, the signal received at a given instant depends upon the symbol in question as well as on the adjacent symbols. Causes of the inter-symbol interference may be numerous. One such cause is due especially to the multiple propagations of the signal between the transmitter and the receiver when the signal is reflected or diffracted by various obstacles. This leads, upon reception, to several copies of the signal mutually shifted in time.

During communications with interference between symbols, it may be difficult to estimate the impulse response of the transmission channel. The quality of this estimate depends upon the capability of eliminating the interference between symbols, and thus of making the correct decisions as to the symbols sent. In general, the estimate of the impulse response of the channel, or more simply the channel estimate, is produced by using least-squares techniques and by using a predetermined sequence of symbols known to the transmitter and to the receiver. This is often referred to as the "training sequence." This may particularly be the case with respect to GSM-based telephones.

The training sequence is present within each burst of symbols sent. When the characteristics of the channel have been sufficiently well estimated, the estimated coefficients of the impulse response of the channel are used in equalization processing, as will be appreciated by those of skill in the art. This is to decipher the received signal, i.e., to recover the logic values of the symbols (data) sent in the burst.

The equalization processing is conventionally followed by processing operations called channel decoding, which are intended to correct any errors to the extent possible. The channel decoding is itself conventionally followed by source decoding, which is intended to reconstitute the information (e.g., speech) initially coded within the transmitter. As noted above, the reception quality, which is generally expressed by the bit error rate (BER), depends greatly on the quality of estimation of the channel.

One of the important parameters for the quality of the estimation lies in the spreading of the channel. This spreading of the channel represents the duration of the channel response to be estimated, and it fixes the number of coefficients of the impulse response of the channel. In practice, depending upon the environment in which the telephone is located, the paths may be more or less spread. Thus, the most spread path is encountered in hilly environments and 7 to 8 coefficients may be then necessary to estimate the impulse response of the channel correctly.

In contrast, there exist paths with less pronounced spreading such as the paths called static paths, which are direct paths with no reflection. For such static paths, only 4 to 5 coefficients may be necessary for a good estimate of the impulse response of the transmission channel. Furthermore, urban paths, which represent the most frequent cases for cellular mobile telephony systems, typically require 5 to 6 coefficients to estimate the impulse response of the transmission channel correctly.

The estimation of the impulse response of the channel is carried out at regular intervals. To produce this estimate the length of the channel is currently defined in advance, i.e., a number of coefficients are fixed a priori for the impulse response of the channel. By way of example, in the case of GSM, the number of coefficients is fixed at a maximum value to satisfy the most stringent recommendations, such as those set forth in the standard ETSI EN 300 910 V8.5 (July 2000) entitled Digital cellular telecommunications systems (Phase 2+), Radio transmission and reception (GSM 05.05 Version 8.5.0 Release 1999).

In other words, the number of coefficients of the impulse response of the transmission channel is taken to be that corresponding to the path exhibiting the most pronounced spreading, i.e., a hilly terrain. However, fixing the value of the number of coefficients of the impulse response of the channel at its maximum value makes it possible to be successful in equalization for the channels which are the most spread. Yet, this substantially degrades performance for the channels with slight spreading, such as those which are encountered in urban environments.

SUMMARY OF THE INVENTION

In view of the foregoing background, it is therefore an object of the invention to enhance the estimate of the channel by discriminating the multipaths which are spread only slightly in time from those which are heavily spread. In other words, the invention adapts the number of coefficients of the impulse response to a multipath type.

In this regard, to discriminate the multi-paths which are only slightly spread from those which are heavily spread, with a view to estimating the impulse response of a transmission channel, the invention evaluates the useful number of coefficients of the impulse response as a function of the actual characteristics of the transmission channel. In particular, the invention uses a parameter of spreading of the transmission channel, known to those skilled in the art as the delay spread.

The invention thus provides a method of estimating the impulse response of an information transmission channel in which a first estimate of the impulse response may be produced by using a predetermined maximum value for the number of coefficients of the impulse response. Then, a time domain spreading parameter of the transmission channel may be evaluated to evaluate the useful number of coefficients, and a final estimate of the impulse response of the transmission channel may be produced by taking the useful number of coefficients into account.

The first estimate may be produced in a conventional manner known to the person skilled in the art and, in practice, carried out over the maximum number of coefficients. For example, the number of coefficients may be a number utilized for a hilly path. Needless to say, if after the evaluation of the time domain spreading parameter it is realized that a hilly path is actually present, the final estimate of the impulse response of the channel will simply be the first estimate. In contrast, the value of the time domain spreading parameter may reveal that the telephone is situated in an urban or static environment, for example. Consequently, the number of coefficients used in the first estimate is inappropriate, and the final estimate of the impulse response will differ from the first estimate.

The final estimate may be derived in several ways. For example, according to one embodiment the final estimate may be derived by producing a new estimate using the useful number of coefficients. This new estimate can be produced by conventional methods known to those of skill in the art. Another embodiment would include correcting the first estimate by cancelling a number of coefficients equal to the difference between the maximum value and the useful number. Here, the cancelled coefficients may be those associated with the versions of the transmitted signal which are most delayed in time.

In other words, whereas in the first embodiment the new estimate of the impulse response is produced by reducing the number of coefficients to the useful number, the second variant provides for a zeroing of the coefficients beyond the number of useful coefficients, i.e., those which are truly necessary. The discrimination which makes it possible to fix the number of coefficients can be done on an instantaneous estimate of the time domain spreading parameter. As an averaging of this estimate, this allows more reliable discrimination.

Accounting for the time domain spreading parameter, which is done to determine the number of useful coefficients of the impulse response, may be implemented by comparing the evaluated time domain spreading parameter with several predetermined values of spreading parameters. These predetermined values may correspond respectively to different spreadings of the transmission channel. Furthermore, this is equivalent to a comparison of the time domain spreading parameter with one or more predetermined threshold values.

The invention also provides a device for estimating the impulse response of an information transmission channel including a processing stage. The processing stage may include evaluation means or circuitry for evaluating a useful number of coefficients of the impulse response of the channel as a function of the actual characteristics of the transmission channel. More particularly, the processing stage may include first estimating means or circuitry able to produce a first estimate of the impulse response of the transmission channel by using a predetermined maximum value for the number of coefficients.

The evaluation means are able to evaluate a time domain spreading parameter of the transmission channel to obtain the useful number of coefficients. Also, the processing stage may include second estimating means or circuitry for deriving a final estimate of the impulse response of the transmission channel by accounting for the useful number of coefficients. The second estimating means may derive the final estimate by producing a new estimate using the useful number of coefficients, for example.

Additionally, the second estimating means may include correction means or circuitry for correcting the first estimate. This may be done by cancelling a number of coefficients equal to the difference between the maximum value and the useful number. Here again, the cancelled coefficients may be those associated with the versions of the transmitted signal which are the most delayed in time.

Furthermore, the evaluation means may include a memory storing different threshold values or several predetermined values of spreading parameters corresponding respectively to different spreadings of the transmission channel. The evaluation means may also include a comparator for comparing the value of the time domain spreading parameter evaluated with the contents of the memory.

The invention also relates to a cellular mobile telephone including a device for estimating the impulse response of an information transmission channel, as described above. Additionally, a computer program according to the invention is provided which includes program code means or circuitry implementing the estimating method as set forth above when the program is run on a processor. Further, the invention also relates to a medium (e.g., a read-only memory) capable of being read by a processor, and including program code means able to implement the estimating method as defined above when the program is run on the processor.

BRIEF DESCRIPTION OF THE DRAWINGS

Other advantages and characteristics of the invention will become apparent upon examining the detailed description of implementations and embodiments, given by way of non-limitative example, and the attached drawings, in which.

DETAILED DESCRIPTION OF THE PREFERRED EMBODIMENTS

Figure 1:
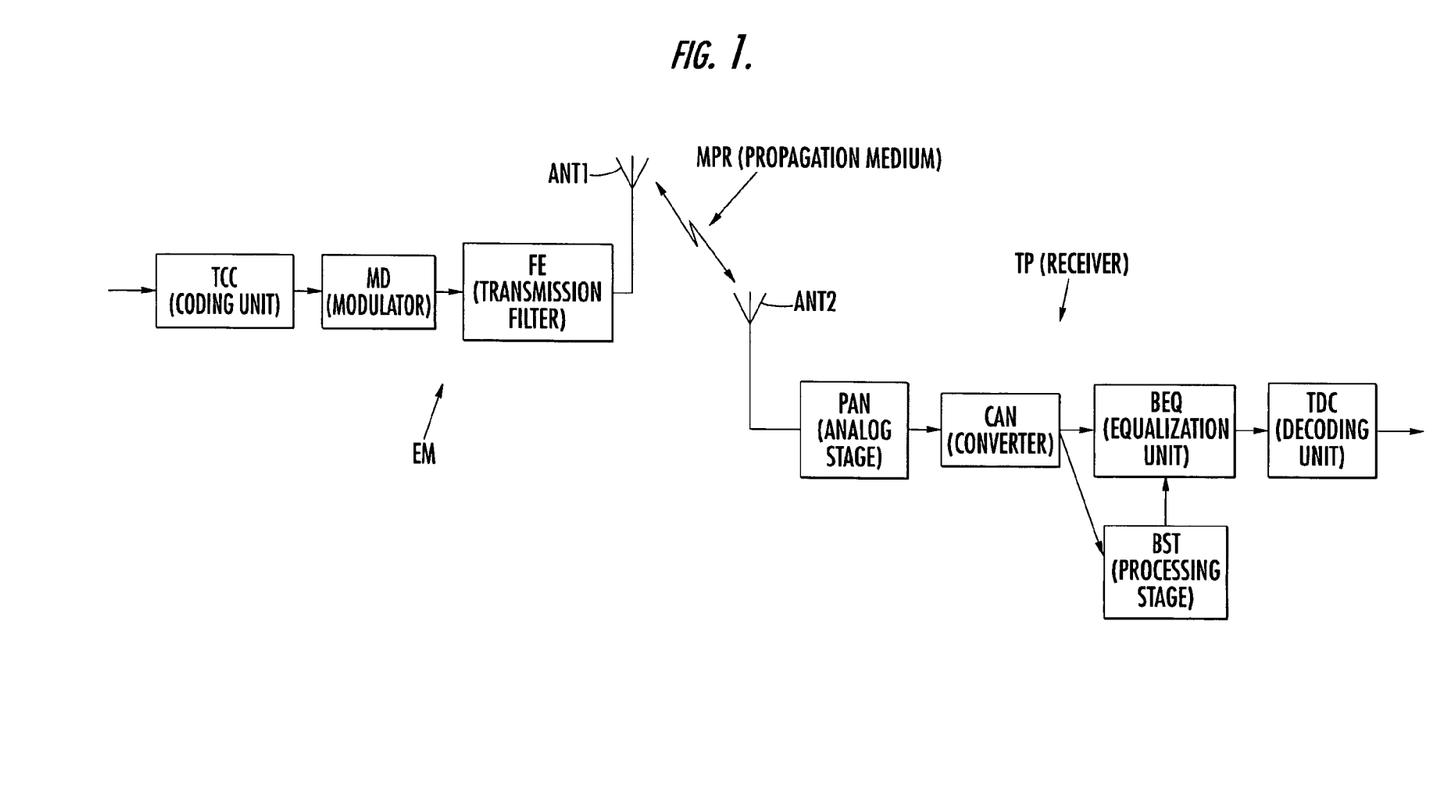
FIG. 1 is a schematic block diagram of the basic constituents of a transmitter and a receiver according to the invention.

Referring more particularly to FIG. 1, it will be assumed for purposes of the following discussion that the invention applies, for example, to the field of cellular mobile telephones, such as those used with GSM or EDGE networks. A transmitter EM includes, upstream, a coding unit TCC for receiving the useful data to be transmitted (e.g., speech). The coding unit TCC also carries out conventional processing operations called channel coding by introducing redundancies into the data stream. The output of the unit TCC includes blocks of bit information.

The unit TCC may be followed by a modulator MD for performing quadrature modulation of QPSK or 8PSK type, for example, and converting the bit signal into an analog signal, as will be appreciated by those skilled in the art. This analog signal is then filtered in a transmission filter FE before being sent to the receiver via an antenna ANT1.

The propagation medium MPR between the transmitter EM and a receiver TP, here a cellular mobile telephone, is air in the present case. The receiver TP, or cellular mobile telephone, may include at the front end an antenna ANT2 coupled to an analog stage PAN. The analog stage PAN performs a frequency conversion to bring the received modulated signal down to baseband, and it performs filtering to keep only the useful part of the spectrum.

After sampling and analog/digital conversion in a converter CAN, the digital stage has the role of producing an estimate of the transmission channel using a processing stage BST, which will be described further below with respect to FIG. 2. The digital stage also eliminates, by virtue of this estimate, the interference between symbols (via an equalization carried out in a unit BEQ), and performs general error correction (i.e., conventional channel decoding) using the unit TDC. For example, this may be done using a Viterbi decoder.

For the purposes of the present invention, the transmission channel is formed by elements situated upstream of the channel estimator, i.e., by analog transmission and reception devices and the the physical propagation medium MPR. It should be noted here that it is also possible to find and to take into account digital processing (e.g., filtering) carried out upstream of the channel estimator but downstream of the analog receiver stage. The impulse response of the channel is in fact the product of the impulse response of the transmitter, the impulse response of the propagation medium proper, and the impulse response of the receiver.

The impulse response H of the transmission channel taken in its entirety is a polynomial in $z^{-1}$ having a useful number of complex coefficients $h_i$, which is unknown a priori. This useful number of complex coefficients depends especially on the signal propagation environment (hilly paths, urban environment, etc.). From the propagation point of view, the hilly environment is a worst case by comparison with the urban environment or by comparison with a static path with no reflection, for example.

Figure 3:
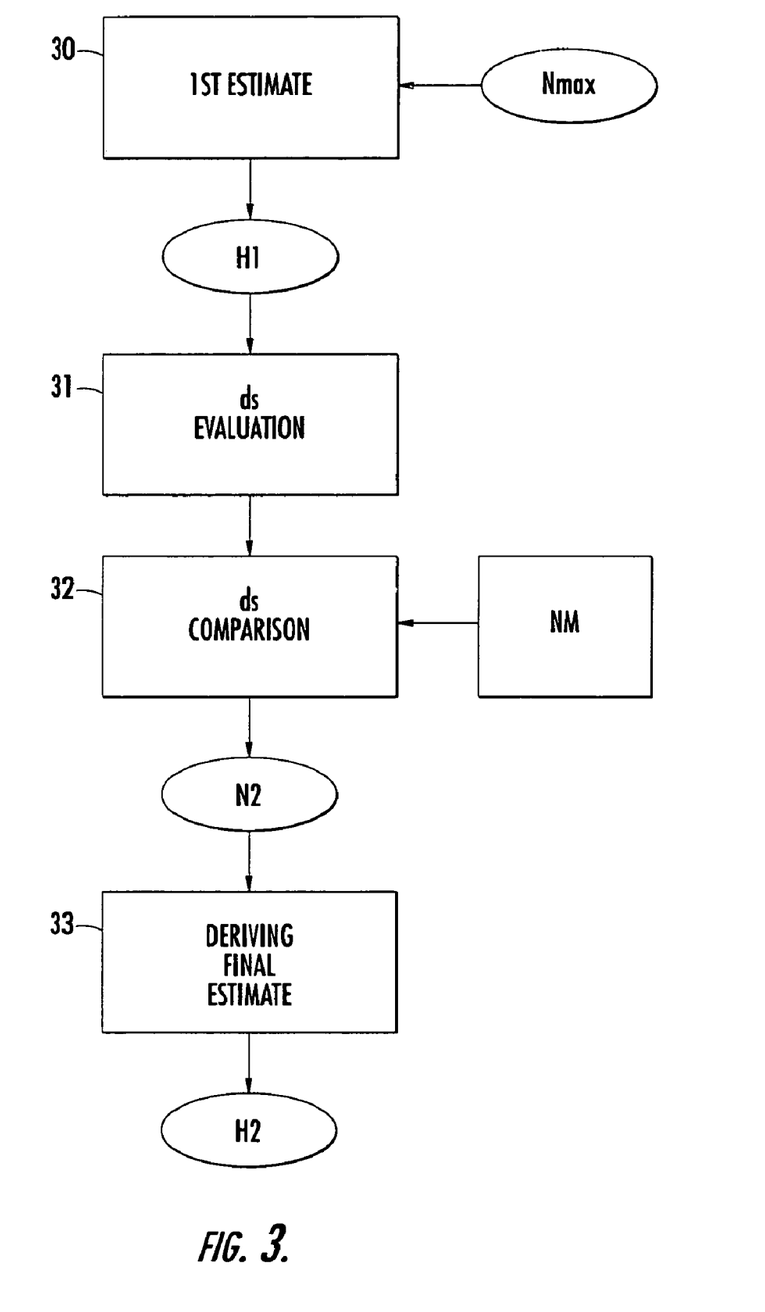
FIG. 3 is a flowchart of one embodiment of a method according to the invention.

According to the invention, as illustrated more particularly in FIG. 3, a first estimate H1 of the impulse response of the transmission channel taken in its entirety will first of all be estimated (stage 30) by using a number Nmax of coefficients. This number Nmax corresponds to a maximum number of coefficients for a worst propagation case, e.g., a hilly path.

In the example described, Nmax is equal to 8. H1(z) is therefore defined by the formula (1) below:

$$H1(z) = h_0 + h_1 z^{-1} + \ldots + h_7 z^{-7} \quad (1)$$

This first estimate may be produced in a conventional way. More precisely, if this first estimate is an estimate known as a trained estimate (i.e., using training sequences formed by a succession of bits of known value), each signal sequence received R is defined by the matrix formula (2) below:

$$R = S \cdot H1 + N, \quad (2)$$

in which S designates the matrix representative of the training sequence, H1 represents the vector formed by the coefficients $h_0$–$h_7$, and N is an additional vector representative of the interference and of the thermal noise.

A conventional way of resolving this system, i.e., estimating the coefficients $h_i$ of the impulse response H1 of the channel taken in its entirety, includes using a least-squares method. This method aims to determine H1 as being the vector minimizing the (Euclidean) norm of the vector N.

Those skilled in the art will appreciate that the vector H1 is defined by the formula (3) below:

$$H = (S^*S)^{-1} S^* R \quad (3)$$

in which the annotation "*" designates the conjugated complex transposed matrix. Needless to say, other methods can also be used to estimate the coefficients $h_i$ of the impulse response of the channel taken in its entirety. These other methods are also well known to those skilled in the art, and will not be discussed in further detail here.

It is also possible to use estimates called blind estimates, i.e., estimates in which no predetermined training sequences are used. Various methods for producing blind estimates of the impulse response H of a channel taken in its entirety will be known to those skilled in the art. By way of example, mention is made here of the article by Jitendra K. Tugnait entitled "Blind Estimation of Digital Communication Channel Impulse Response," IEEE Transactions On Communications, Vol. 42, No. 2/3/4, February/March/April 1994.

Figure 2:
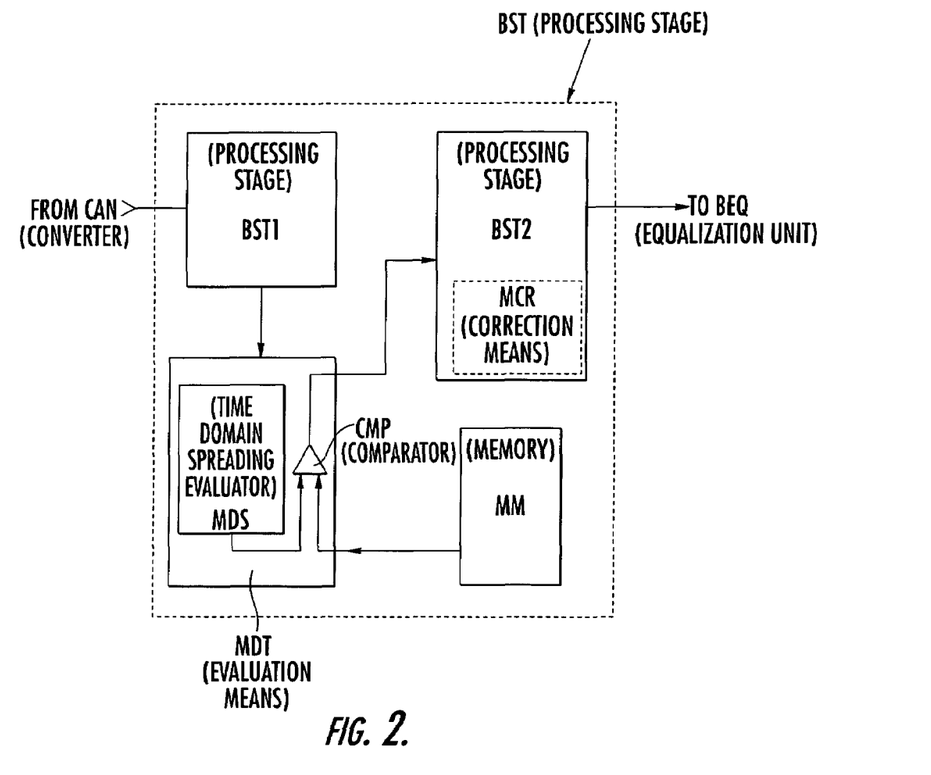
FIG. 2 is a more detailed schematic block diagram illustrating a portion of the receiver of FIG. 1.

The channel estimate is produced in a unit BST (FIG. 2). More precisely, the first estimate is produced in a sub-unit BST1 of the unit BST. In hardware terms, the unit BST as a whole can be formed, for example, by a signal processor in which the processing operations carried out in the unit BST1 are implemented by software. These processing operations are then in the form of program code, which can easily be written by the person skilled in the art on the basis of the functional definition of these processing operations. The program code means are then stored, for example, in a read-only memory associated with the processor. That being so, an entirely hardware implementation of the unit BST is equally possible, for example, in the form of an application specific integrated circuit (ASIC).

Once this first estimate H1 has been obtained, the useful number N2 of coefficients of the impulse response of the channel will be evaluated by taking account of the actual characteristics of the transmission channel (i.e., the real environment in which the mobile telephone is located) within evaluation means MDT. To do this, the evaluation means MDT will evaluate, in means MDS, a time domain spreading parameter ds of the transmission channel, for example by using formula 4 below:

$$ds = \left( \sum_{i=0}^{N\max} (i - ave)^2 h_i^2 \right)^{1/2} \quad (4)$$

in which the term "ave" is defined by formula 5 below:

$$ave = \left( \sum_{i=0}^{N\max} i h_i^2 \right) \Big/ \left( \sum_{i=o}^{N\max} h_i^2 \right) \quad (5)$$

Once this evaluation stage 31 is terminated, the evaluation means MDT will compare (stage 32), in a comparator CMP, the value obtained for the time domain spreading parameter with several predefined values of spreading parameters stored in a memory MM of the processing stage BST. By way of example, the memory MM may include a value equal to 0.55 corresponding to a spreading parameter of a static multipath, a value equal to 0.65 corresponding to an urban multipath, and a value equal to 1.43 corresponding to a spreading parameter of a hilly multipath.

Depending on the result of this comparison, the evaluation means will deduce therefrom the number N2 of useful coefficients of the impulse response of the channel as a function of the type of multipath selected. Hence, if the value 0.55 has been selected, the number N2 of useful coefficients will be taken, for example, to be equal to 4, while it will be taken to be equal to 6 for a path of urban type, and it will be kept equal to 8 for a path of hilly type.

In practice, it will be possible to use wider comparison thresholds. Thus, for example, if the value obtained is less than 0.6, N2 will be taken to be equal to 4. If the value obtained lies between 0.6 and 1, N2 will be taken to be equal to 6, and it will be 8 if the value obtained is greater than 1.

It is assumed below, for example, that the mobile telephone is located at the instant of evaluation on an urban-type path. As a consequence, the impulse response of the channel is a $5^{th}$ degree polynomial in $z^{-1}$, with 6 complex coefficients $h_0$–$h_5$. The second estimation means BST2 will then (stage 33) derive the final estimate H2 of the impulse response of the channel.

Figure 4:
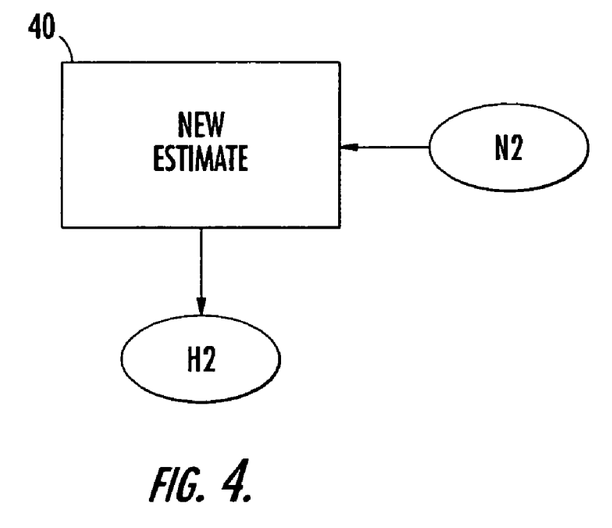
FIGS. 4 and 5 are flowcharts illustrating in more detail two alternate embodiments for deriving the final estimate of the impulse response of the channel.

In this regard, two alternatives are possible. A first alternative, which is illustrated in FIG. 4, includes producing a new estimate of the impulse response of the channel, this time by using the number N2 of coefficients (i.e., 6 coefficients in this instance). This new estimate can be produced by any conventional means. The means BST2 may then include means with a structure comparable to that of the means BST1. Needless to say, it would also be possible to use the means BST1 for this new estimate.

Figure 5:
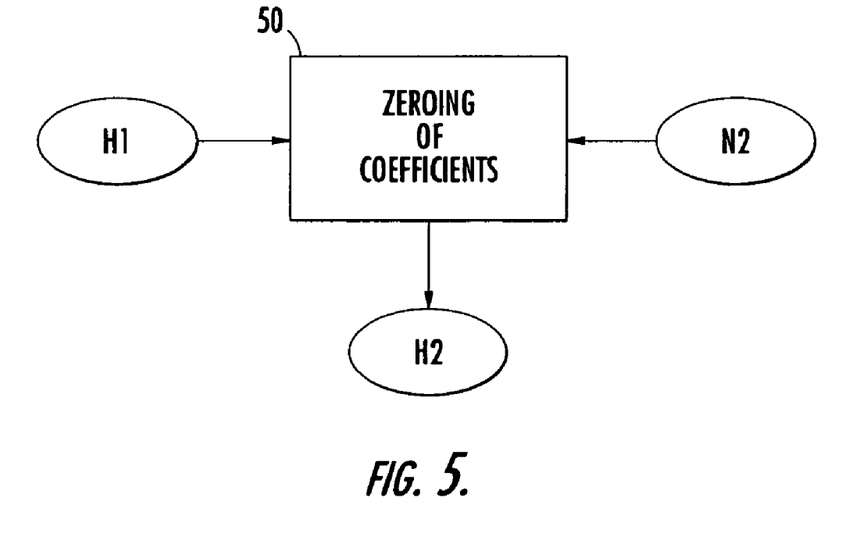

Another variation, which is illustrated in FIG. 5, includes setting the unused coefficients of the impulse response H1 of the channel to zero (i.e., the coefficients $h_6$ and $h_7$). In the present case, this corresponds to the most time delayed versions of the signal. This zeroing is carried out, for example, in correction means MCR.

Figure 6:
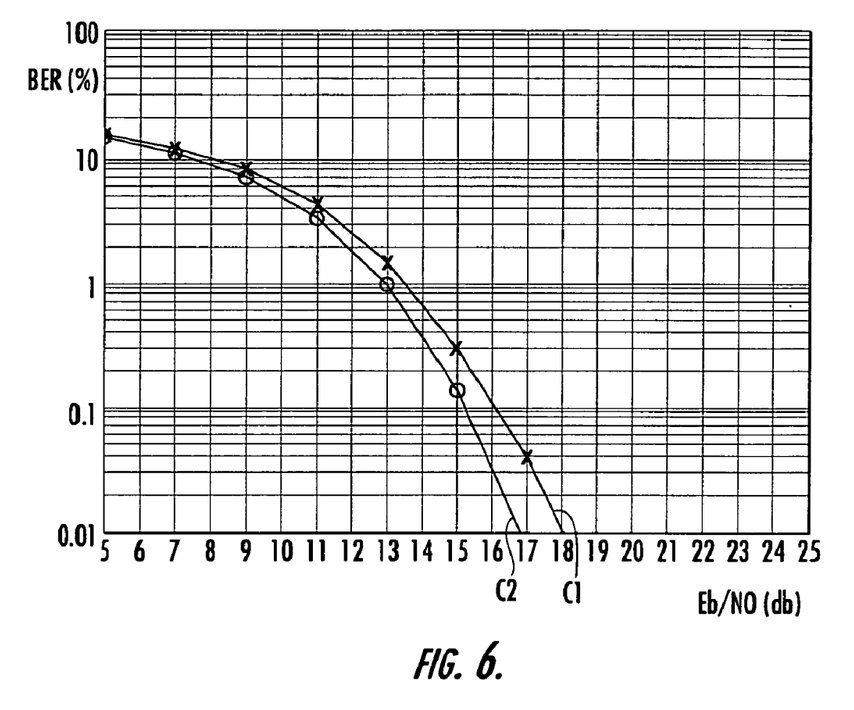
FIGS. 6 to 8 are diagrams illustrating the advantages and effects of the invention for different types of paths.
Figure 7:
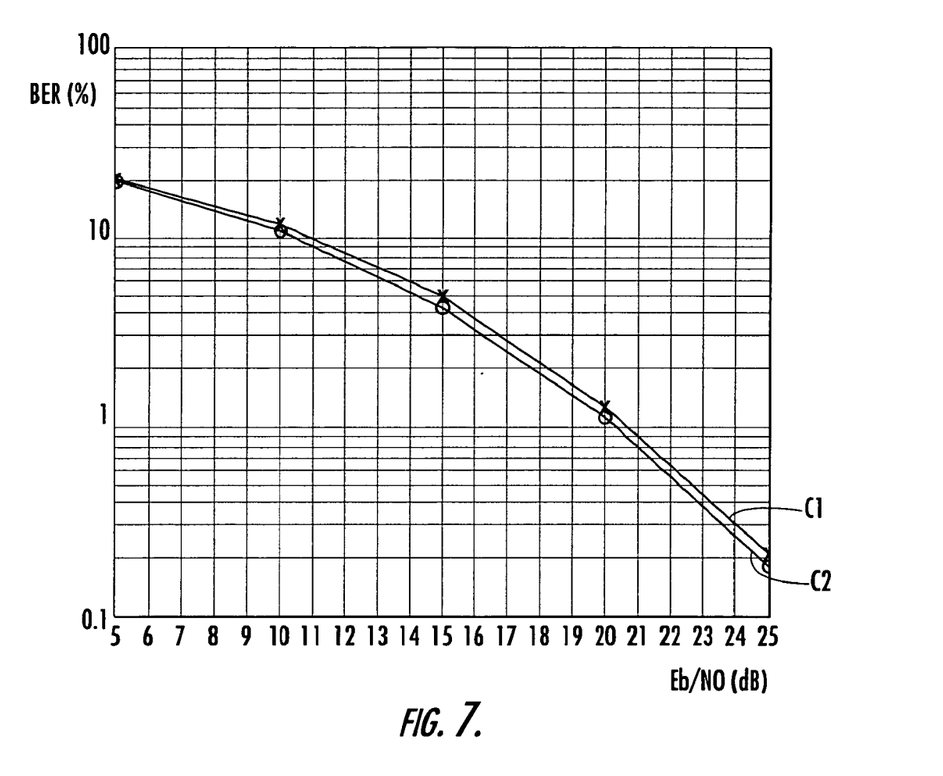
Figure 8:
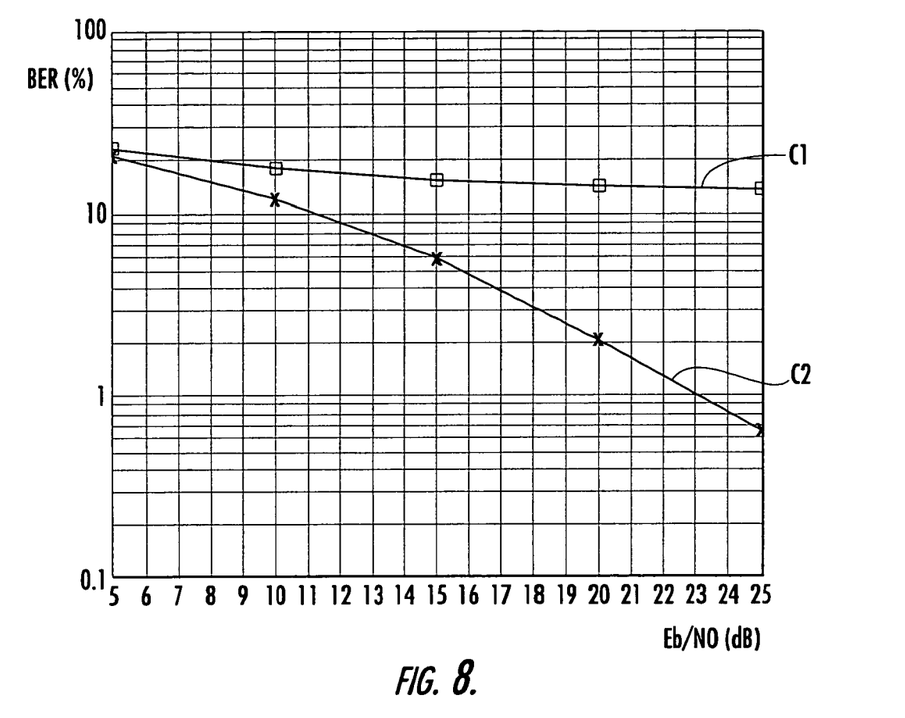

Turning now to FIGS. 6 to 8, curves illustrating the profile of the bit error rate (BER) by comparison with the Eb/N0 ratio for different types of multipath in a mobile telephony system using EGPRS (or EDGE) modulation (maximum throughput of 52.2 Kbits per second per time interval) may be seen. The legend Eb designates the energy per bit, and N0 designates the power density of noise per hertz.

A static multipath is illustrated in FIG. 6. The curve C1 corresponds to an impulse response of the channel estimated according to the prior art with a maximum number of coefficients. The curve C2 corresponds to an impulse response estimated according to the invention with an adapted number of coefficients. Hence, it will be observed that the invention makes it possible to obtain a reduced bit error rate, especially for strong signals.

The same is true for the curve C2 of FIG. 7, which corresponds to an impulse response estimated according to the invention with an adapted number of coefficients for an urban path. The curve C1 corresponds to a channel impulse response estimated with a maximum number of coefficients.

Further, the curve C1 of FIG. 8 represents an impulse response of a transmission channel estimated according to the prior art with a reduced number of coefficients, although the environment is of the hilly type. This is because, for reasons of cost and complexity, especially for M-ary modulation with M greater than 2 (e.g., 8 PSK modulation), certain prior art devices reduce the maximum number of coefficients of the impulse response of the channel a priori. This then leads to inaccuracies for hilly environments. The curve C2 of FIG. 8 corresponds to an impulse response estimated according to the invention, for the same hilly terrain, but with an adapted number of coefficients (i.e., a larger number in this instance).

It is the coefficients of the polynomial H2 which will be used in the equalization unit BEQ of the telephone TP (FIG. 1). Among the equalization processing operations, two main classes can be considered. The first is those which carry out the detection symbol by symbol, such as, for example, the algorithm known to those skilled in the art as decision feedback equalization (DFE). The essential aspects of this algorithm are described, for example, in the work by John G. Proakis entitled "Digital Communications", third edition, McGraw-Hill, Inc.

The second class includes those which carry out detection of a sequence of symbols. These may include, for example, the maximum likelihood sequence estimation algorithm (MLSE) or decision feedback sequence estimation (DFSE), both of which are known in the art. These two algorithms have been the subject of numerous publications. Further reference regarding the MLSE algorithm may be found in the above noted work by John G. Proakis, and further information regarding the DFSE algorithm may be found in an article by Hans C. Guren and Nils Holte entitled "Decision Feedback Sequence Estimation for Continuous Phase Modulation on a Linear Multipath Channel", IEEE Transactions on Communications, Vol. 41, No. 2, February 1993.

The symbol-by-symbol detection algorithms are of very low complexity by comparison with the algorithms for detection by sequence, but give inferior performance. It is for this reason that equalization algorithms using an estimate by sequence are generally chosen.

The bits of the impulse burst thus delivered after equalization are then decoded in the channel-decoding unit TDC. The equalization algorithms and those for channel decoding are also run by the signal processor, for example.

The invention is not limited to the embodiments and implementations described above, but embraces numerous variations thereof. Furthermore, the estimation device according to the invention may not only be incorporated into a cellular mobile telephone, but also into the receiving system of a base station or, more generally, into any digital information receiver.

The invention claimed is:

1. A method of estimating an impulse response of an information transmission channel in a signal propagation environment and comprising:
   estimating the impulse response based upon a useful number of coefficients of the impulse response, the useful number of coefficients being a function of the signal propagation environment, by
   providing an initial estimate of the impulse response based upon a predetermined number of the coefficients,
   determining a time domain spreading parameter based upon the initial estimate,
   using the time domain spreading parameter to determine the useful number of coefficients, and
   providing a final estimate of the impulse response based upon the useful number of coefficients.

2. The method of claim 1 wherein providing the final estimate comprises correcting the initial estimate by cancelling a number of coefficients equal to a difference between the predetermined number and the useful number of coefficients.

3. The method of claim 1 wherein using the time domain spreading parameter to determine the useful number of coefficients comprises comparing the time domain spreading parameter with a plurality of predetermined spreading parameter values each corresponding to a different time domain spreading of the transmission channel.

4. A method of estimating an impulse response of an information transmission channel in a signal propagation environment and comprising:

determining a useful number of coefficients of the impulse response as a function of the signal propagation environment based upon a time domain spreading parameter by comparing the time domain spreading parameter with a plurality of predetermined spreading parameter values each corresponding to a different time domain spreading of the transmission channel; and estimating the impulse response based upon the useful number of coefficients.

5. A device for estimating an impulse response of an information transmission channel in a signal propagation environment comprising:

a processing stage;

said processing stage comprising evaluation means for defining a useful number of coefficients of the impulse response as a function of the signal propagation environment and for estimating the impulse response based upon the useful number of coefficients by:

providing an initial estimate of the impulse response based upon a predetermined number of the coefficients, determining a time domain spreading parameter based upon the initial estimate, using the time domain spreading parameter to determine the useful number of coefficients, and providing a final estimate of the impulse response based upon the useful number of coefficients.

6. The device of claim 5 wherein said processing stage further comprises correction means for providing the final estimate by correcting the initial estimate by cancelling a number of coefficients equal to a difference between the predetermined number and the useful number of coefficients.

7. The device of claim 5 wherein said evaluation means comprise:

a memory having a plurality of predetermined spreading parameter values stored therein each corresponding to a respective time domain spreading of the transmission channel; and a comparator for comparing the time domain spreading parameter with the predetermined spreading parameter values.

8. A device for estimating the impulse response of an information transmission channel in a signal propagation environment comprising:

an evaluator for determining a useful number of coefficients of the impulse response as a function of the signal propagation environment by providing an initial estimate of the impulse response based upon a predetermined number of the coefficients, determining a time domain spreading parameter based upon the initial estimate, and using the time domain spreading parameter to determine the useful number of coefficients; and estimation circuitry for providing a final estimate of the impulse response based upon the useful number of coefficients.

9. The device of claim 8 wherein said estimation circuitry derives the final estimate by correcting the initial estimate by cancelling a number of coefficients equal to a difference between the predetermined number and the useful number of coefficients.

10. The device of claim 8 further comprising a memory having a plurality of predetermined values of spreading parameters each corresponding to different time domain spreading of the transmission channel stored therein; and wherein said evaluator further comprises a comparator for comparing the time domain spreading parameter with the predetermined values.

11. A cellular telephone comprising:

an antenna;

a receiver for receiving cellular signals via said antenna from a base station over an information transmission channel in a signal propagating environment; and a processing stage for estimating an impulse response of the information transmission channel the signal propagation environment and comprising evaluation means for defining a useful number of coefficients of the impulse response as a function of the signal propagation environment, and for estimating the impulse response based upon the useful number of coefficients by providing an initial estimate of the impulse response based upon a predetermined number of the coefficients, determining a time domain spreading parameter based upon the initial estimate, using the time domain spreading parameter to determine the useful number of coefficients, and providing a final estimate of the impulse response based upon the useful number of coefficients.

12. The cellular telephone of claim 11 wherein said processing stage further comprises correction means for correcting the initial estimate by cancelling a number of coefficients equal to a difference between the predetermined number and the useful number of coefficients.

13. A computer-readable medium having computer-executable instructions for estimating an impulse response of an information transmission channel in a signal propagation environment by:

estimating the impulse response based upon a useful number of coefficients of the impulse response, the useful number of coefficients being a function of the signal propagation environment by:

providing an initial estimate of the impulse response based upon a predetermined number of the coefficients, determining a time domain spreading parameter based upon the initial estimate, using the time domain spreading parameter to determine the useful number of coefficients, and providing a final estimate of the impulse response based upon the useful number of coefficients.

14. The computer-readable medium of claim 13 wherein providing the final estimate comprises correcting the initial estimate by cancelling a number of coefficients equal to a difference between the predetermined number and the useful number of coefficients.

15. The computer-readable medium of claim 13 wherein using the time domain spreading parameter to determine the useful number of coefficients comprises comparing the time domain spreading parameter with a plurality of predetermined spreading parameter values each corresponding to a different time domain spreading of the transmission channel.

* * * * *